(12) United States Patent
Chang Hu

(10) Patent No.: US 9,398,652 B2
(45) Date of Patent: Jul. 19, 2016

(54) CONTROL METHOD FOR LIGHT COLOR OF LIGHTING DEVICE

(71) Applicant: Yu-Jie Chang Hu, Hsinchu County (TW)

(72) Inventor: Yu-Jie Chang Hu, Hsinchu County (TW)

( * ) Notice: Subject to any disclaimer, the term of this patent is extended or adjusted under 35 U.S.C. 154(b) by 0 days.

(21) Appl. No.: 14/843,618

(22) Filed: Sep. 2, 2015

(65) Prior Publication Data

US 2016/0095176 A1    Mar. 31, 2016

(30) Foreign Application Priority Data

Sep. 29, 2014    (TW) .............................. 103133674 A

(51) Int. Cl.
H05B 33/08    (2006.01)

(52) U.S. Cl.
CPC ........ H05B 33/0815 (2013.01); H05B 33/0827 (2013.01)

(58) Field of Classification Search
CPC .... H05B 37/02; H05B 37/0272; H05B 33/08; H05B 33/0815; H05B 33/0842; H05B 33/0845; H05B 33/0884; H05B 33/0806; H05B 33/0827; H05B 33/0833; H05B 33/0839

USPC .................. 315/185 R, 307, 308, 312, 209 R, 315/224–226, 291–297
See application file for complete search history.

(56) References Cited

U.S. PATENT DOCUMENTS

2007/0188427 A1*  8/2007  Lys .................... H05B 33/0815
                                                                              345/82
2015/0008846 A1    1/2015  Chen et al.

* cited by examiner

Primary Examiner — Jimmy Vu
(74) Attorney, Agent, or Firm — Muncy, Geissler, Olds & Lowe, P.C.

(57) ABSTRACT

A control method for light color includes: turning on an external switch of a lighting device to send a color control signal to a light emitting unit that further emits a white light; turning off the external switch for a first interval and again turning it on; determining the first interval is shorter than a first predetermined period and sending multiple first color control signals to the light emitting unit to cause the light emitting unit to emit multiple different light colors $C_n$; when the light emitting unit emits a light color $C_i$, turning off the external switch for a second interval and again turning it on; determining the second interval is shorter than a second period, and sending a second color control signal to the light emitting unit to cause the light emitting unit to emit a color light corresponding to the light color $C_i$.

9 Claims, 4 Drawing Sheets

CONTROL METHOD FOR LIGHT COLOR OF LIGHTING DEVICE

FIELD OF THE INVENTION

The present invention relates to a control method for a light color of a lighting device, and particularly to a control method for a light color of a lighting device by an external power switch.

BACKGROUND OF THE INVENTION

With the progress in light emitting diode (LED) manufacturing technologies, instead of being only a conventional white color, light colors emitted are available in various colors including red, green, blue and a combination of the above colors. Thus, in addition to illuminating a target to have the target appear more clear, applications for achieving objects of decorating environments, building atmosphere and hosting entertainment activities have gradually become popular.

The U.S. Patent Publication No. 20150008846, "Integrated Wireless and Wired Light Control System", discloses an example of a conventional control method for a lighting device. The above disclosure includes a wired control device, a wireless control device, a communication module and a plurality of lighting devices. The wired control device includes a first user interface and a first wired communication protocol interface. The wireless control device includes a second user interface and a first wireless communication protocol interface. The communication module includes a second wired communication protocol interface and a second wireless communication protocol interface. Each of the lighting devices includes a third wired communication protocol interface, and performs data exchange with the third wired communication protocol interface of another one of the light devices by a network cable connected to the third wired communication protocol interface. The first wired communication protocol interface and the second wired communication protocol interface are capable of directly performing data exchange. The first wireless communication protocol interface and the second wireless communication protocol interface are capable of directly performing data exchange. Lighting parameters of the first user interface and the second user interface include color, brightness, lighting angle or illumination time.

It is known from the above that, the lighting devices can be controlled through the wired control device or the wireless control device by wired or wireless means, and conditions including color, brightness, lighting angle and illumination time of these lighting devices can also be controlled. However, when performing a control process by the above approach, the lighting devices need to be in a powered state and be controlled through a transmission network. Thus, the above control system and operations are more complicated than those of common lighting devices, and following issues may be caused.

1. An exclusive control switch needs to be provided, and a power switch cannot be shared with common lighting devices.

2. An additional control device is required for control operations, e.g., an electronic device such as a remote controller, a cell phone, or a computer.

3. When a cell phone or a computer is used as the control device for control operations, an application program corresponding to the lighting devices needs to be installed, resulting in utilization complexities and inconvenience.

4. For both wired control and wireless control, an additional device needs to be prepared, e.g., a control switch, the control device or a wiring layout (wired control), leading to increased application costs.

SUMMARY OF THE INVENTION

It is a primary object of the present invention to solve issues of complicated operations and incovenience as well as high application costs of a conventional solution that controls a lighting device using an additional control device.

To achieve the above object, the present invention provides a lighting device. The lighting device includes a light emitting unit, a rectifier, a power converting circuit and a microprocessor unit. The light emitting unit includes a plurality of light emitting diodes (LEDs). The rectifier, electrically connected to a city power, determines by an external switch whether to obtain an external power to output a high voltage direct current. The power converting circuit, electrically connected to the rectifier, receives the high voltage direct current and automatically becomes activated to perform a power conversion to output an operating voltage and a driving voltage. The microprocessor unit, electrically connected between the power converting circuit and the light emitting unit, receives the operating voltage and becomes activated. The microprocessor unit determines that the external switch is turned off for shorter than a first predetermined period and again turned on, and then sends a plurality of first color control signals to the light emitting unit according to a timing sequence to cause the light emitting unit to emit a plurality of different light colors $C_n$. There are n light colors $C_n$, and n is a parameter associated with a resolution. When the light emitting unit emits the light color $C_i$, the microprocessor unit determines that the external switch is turned off for shorter than a second predetermined period and again turned on, and then sends a second color control signal to the light emitting unit. The light emitting unit receives the second color control signal and then emits a color light corresponding to the light color $C_i$.

To achieve the above object, the present invention further provides a control method for a light color of a lighting device. The control method includes following steps.

In step 1, a lighting device is provided. The lighting device includes a light emitting unit, a rectifier, a power converting circuit, a city power detecting unit and a microprocessor unit. The light emitting unit includes a plurality of LEDs. The rectifier, electrically connected to a city power, determines by an external switch whether to obtain an external power from the city power to output a high voltage direct current. The power converting circuit is electrically connected to the rectifier. The city power detecting unit is electrically connected between the external power and the rectifier. The microprocessor unit is electrically connected between the power converting unit and the light emitting unit.

In step 2, the external switch is turned on to cause the power converting circuit to receive the high voltage direct current and to perform a power conversion to output an operating voltage and a driving voltage. The microprocessor unit receives the operating voltage and becomes activated to send a color control signal. The light emitting unit receives the color control signal and then emits a white light.

In step 3, the external switch is turned off for a first interval, and is again turned on.

In step 4, the microprocessor unit performs a first identification procedure that determines that the first interval is shorter and a first predetermined period, and sends a plurality of first color control signals according to a timing sequence to the light emitting unit. The light emitting unit receives the first color control signals and emits a plurality of different light colors $C_n$. There are n light colors $C_n$, and n is a parameter associated with a resolution.

In step 5, when the light emitting unit emits the light color $C_i$, the external switch is turned off for a second interval and is again turned on.

In step 6, the microprocessor unit performs a second identification procedure that determines that the second interval is shorter and a second predetermined period, and sends a plurality of second color control signals to the light emitting unit. The light emitting unit receives the second color control signals and emits a color light corresponding to the light color $C_i$, where $C_i$ represents the light color emitted at the $i^{th}$ timing sequence.

In conclusion, by controlling the first interval and the second interval, different lighting modes and light colors emitted by the lighting device can be controlled. As such, a user may determine the lengths of the first interval and the second interval through the external switch, so as to control for a desired light emitting mode and light color without requiring an additional control device, thereby achieving simplified operations and reduced costs.

DETAILED DESCRIPTION OF THE PREFERRED EMBODIMENTS

Figure 1:
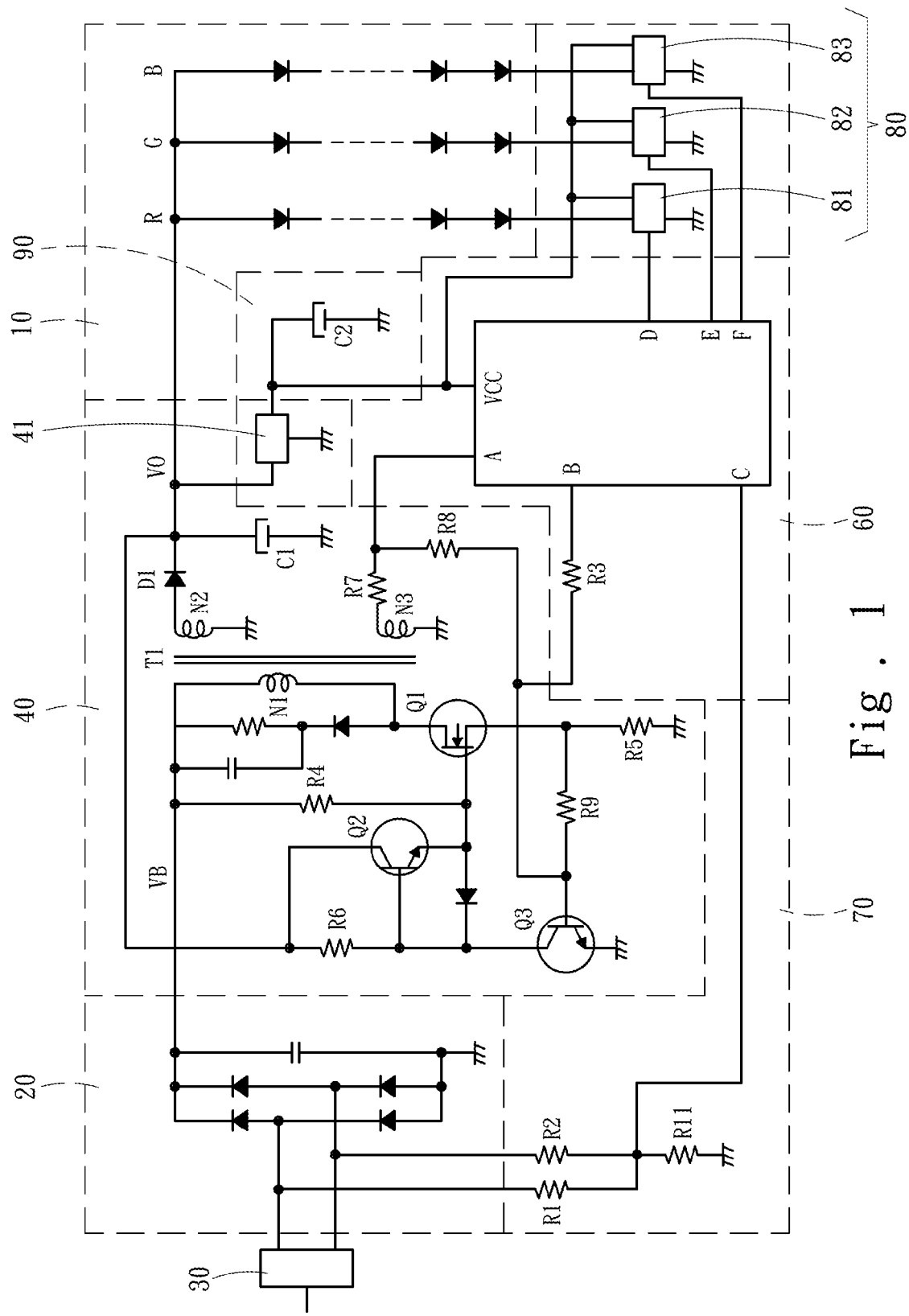
FIG. 1 is a circuit diagram of a device according to a first embodiment of the present invention.

Details and technical contents of the present invention are given with the accompanying drawings below. FIG. 1 shows a circuit diagram of a device according to a first embodiment of the present invention. As shown, the present invention provides a lighting device including a light emitting unit 10, a rectifier 20, a power converting circuit 40, a voltage regulator unit 41 included in the power converting circuit 40, and a microprocessor unit 60. The light emitting unit 10 includes a plurality of light emitting diodes (LEDs). For example, the light emitting unit 10 may include a plurality of red LEDs, green LEDs and blue LEDs respectively emitting red light, green light and blue light, i.e., the three primary colors, so as to form combinations and emit a plurality of different colors.

The rectifier 20 is electrically connected to a city power and determines by an external switch 30 whether to obtain an external power from the city power to output a high voltage direct current (VB). For example, the external switch 30 according to an embodiment of present invention may be a wall switch disposed on a wall. It should be noted that the above example is not to be construed as a limitation to the present invention. In one embodiment, the rectifier 20 includes a plurality of diodes and a capacitor connected in parallel to the diodes. The rectifier 20 may be designed by various approaches that mainly involve diodes, diode modules and capacitors, and is adapted to convert the city power in an alternating current to the high voltage direct current having direct current properties.

The power converting circuit 40, electrically connected to the rectifier 20, receives the high voltage direct current, and automatically becomes activated to perform a power conversion to output an operating voltage and a driving voltage. For example, the power converting circuit 40 may be a self-excited power converting circuit, a module power converting circuit, or a separately excited power converting circuit, with associated details given below. When the high voltage direct current is inputted, the high voltage direct current passes through a fourth resistor R4 to reach a metal-oxide-semiconductor field-effect transistor (MOSFET) Q1. Thus, the gate potential of the MOSFET Q1 is caused to rise and the MOSFET Q1 becomes turned on, such that the high voltage direct current passes through a primary coil group N1 of a transformer T1 to enter an magnetic energy storing state. The high voltage direct current then passes through a fifth resistor R5 and is then grounded. When the high voltage direct current passes through the fifth resistor R5, a voltage that is directly proportional to the high voltage direct current is generated. This voltage generate passes through a ninth resistor R9 to generate a change that turns on a transistor Q3 and turns off the MOSFET Q1, i.e., entering a turned off state from a turned on state. The above change causes the transformer T1 to enter an magnetic energy releasing state, such that the electric energy released from a second coil group N2 is transmitted via a first diode D1 to a first capacitor C1 to generate an output voltage VO. Meanwhile, a third coil group N3 releases a feedback voltage, which is fed to the transistor Q3 via a seventh resistor R7 and an eighth resistor R8. The feedback voltage persistently turns on the transistor Q3. When the energy releasing state of the transformer T1 ends, the feedback voltage of the third coil group N3 disappears and the transistor Q3 becomes turned off, such that the MOSFET Q1 again becomes turned on. The above process is cyclically iterated to convert the output voltage VO. In the embodiment, the output voltage VO is the driving voltage.

In one embodiment, the voltage regulator unit 41 is electrically connected to the microprocessor unit 60. The driving voltage outputs an operating voltage via the voltage regulator unit 41 to the microprocessor unit 60. In one embodiment, in practice, the power converting circuit 40 and the voltage regulator unit 41 may be integrated, and designed as an integral to become a power converting module to perform respective functions. Alternatively, an alternating-direct current converting circuit module is used to replace the rectifier 20 and the power converting circuit 40 to perform the same functions.

After receiving the operating voltage and becoming activated, the microprocessor unit 60 determines that the external switch 30 is turned off for shorter than a first predetermined period and again turned on, and sends a plurality of first color control signals to the light emitting unit 10 according to a timing sequence. The light emitting unit 10 is caused to emit a plurality of different light colors $C_n$. There are n light colors $C_n$, and n is a parameter associated with a resolution. The timing sequence may be further defined as—timing: a color changing interval (t) synchronous with a frequency of the city power; sequence: a sequence variance (i) of the light color. The timing sequence provides a function of color changing synchronous with the frequency of the city power. The microprocessor unit 60 includes different ends for performing different functions, including a first end A, a second end B, a third end C, a fourth end D, a fifth end E and a sixth end F. The third end C has a digital/analog conversion detecting function. Further, the microprocessor unit 60 is electrically connected to a second capacitor C2, which provides the microprocessor unit 60 with electric power for continual operations when the external power is interrupted. The microprocessor unit 60 is capable of interrupting the feedback signal of the third coil group N3 via the first end A, and changing the turn on and turn off states of the transistor Q3 via the second end B. Thus, the microprocessor unit 60 is enabled to control the power converting circuit 40.

When the light emitting unit 10 emits the light color $C_i$, the microprocessor unit 60 determines that the external switch 30 is turned off for shorter than a second predetermined period and again turned on, and sends a second color control signal to the light emitting unit 10. The light emitting unit 10 receives the second color control signal, and emits a color light corresponding to the light color $C_i$. The color control signal is a control signal (PWM) with different turn-on/turn-off period ratios that the microprocessor unit 60 respectively outputs at the fourth end D, the fifth end E and the sixth end F.

In the present invention, the resolution is associated with light steps. For example, in an embodiment of the present invention, the three primary colors are respectively divided into 256 light steps and may form 768 colors after being mixed with one another. Thus, n=768. Further, n is associated with the byte the microprocessor unit 60 uses, and is not necessarily a constant value.

It should be noted that, the color changing interval (t) is the duration of a single color control signal, and there are n different light colors. That is, a cycle period of one color that emits the plurality of different light colors is equal to (t)×(n), where (t) is a phase interval of the city power detected through the third end C and a multiple of the interval is used as the color changing interval (t). The sequence variance (i) of the light color is equal to a variable between 0 and n. The plurality of color control signals begin at (i)=0, and the color steps of the three primary colors are changed once after each color changing interval (t). Meanwhile, the color sequence variance increases by one, i.e., (i)=i+1. When the $n^{th}$ different light color is emitted, (i)=n, and one color cycle is completed at this point. Wherein, $C_n$ represents a set of colors from (i)=0 to (i)=n, and $C_i$ represents one of the colors from (i)=0 to (i)=n. After completing one color cycle, (i)=0 again enters the next color cycle.

In one embodiment, the lighting device may further include a city power detecting unit 70, a plurality of constant current electronic switches 80, an internal powering unit 90, and a detecting capacitor. The city power detecting unit 70, electrically connected between the external power and the rectifier 20, includes an output node electrically connected to the microprocessor unit 60. It should be noted that, a voltage level detectable by the microprocessor unit 60 is far lower than a voltage level of the city power. Thus, given that the voltage amplitude of the city power is reduced through the city power detecting unit 70, the microprocessor unit 60 is then able to detect the voltage amplitude and phase of the city power. A circuit pattern used by the city power detecting unit 70 is associated with the microprocessor unit 60, and so there are many available circuits to choose from, with one of these circuits described here as an example. These constant current electronic switches 80, electrically connected between the LEDs and the microprocessor unit 60, include a first constant current electronic switch 81, a second constant current electronic switch 82 and a third constant current electronic switch 83. These constant current electronic switches 80 are a type of electronic switch electronic circuits that can be controlled to be turned on or turned off A current amount of the constant current electronic switches 80 is zero when the constant current electronic switches 80 are controlled to be turned off, and a turned on current amount may be automatically limited within a range of a fixed standard when the constant current electronic switches 80 are controlled to be turned on. It should be noted that, the constant current electronic switches 80 may have many different designs, including a separate circuit design, a constant current integrated circuit (IC) design, or integrate into the microprocessor in the microprocessor unit 60. The internal powering unit 90 and the detecting capacitor are both electrically connected to the microprocessor unit 60. The internal powering unit 90 may be a battery or a capacitor.

Figure 2:
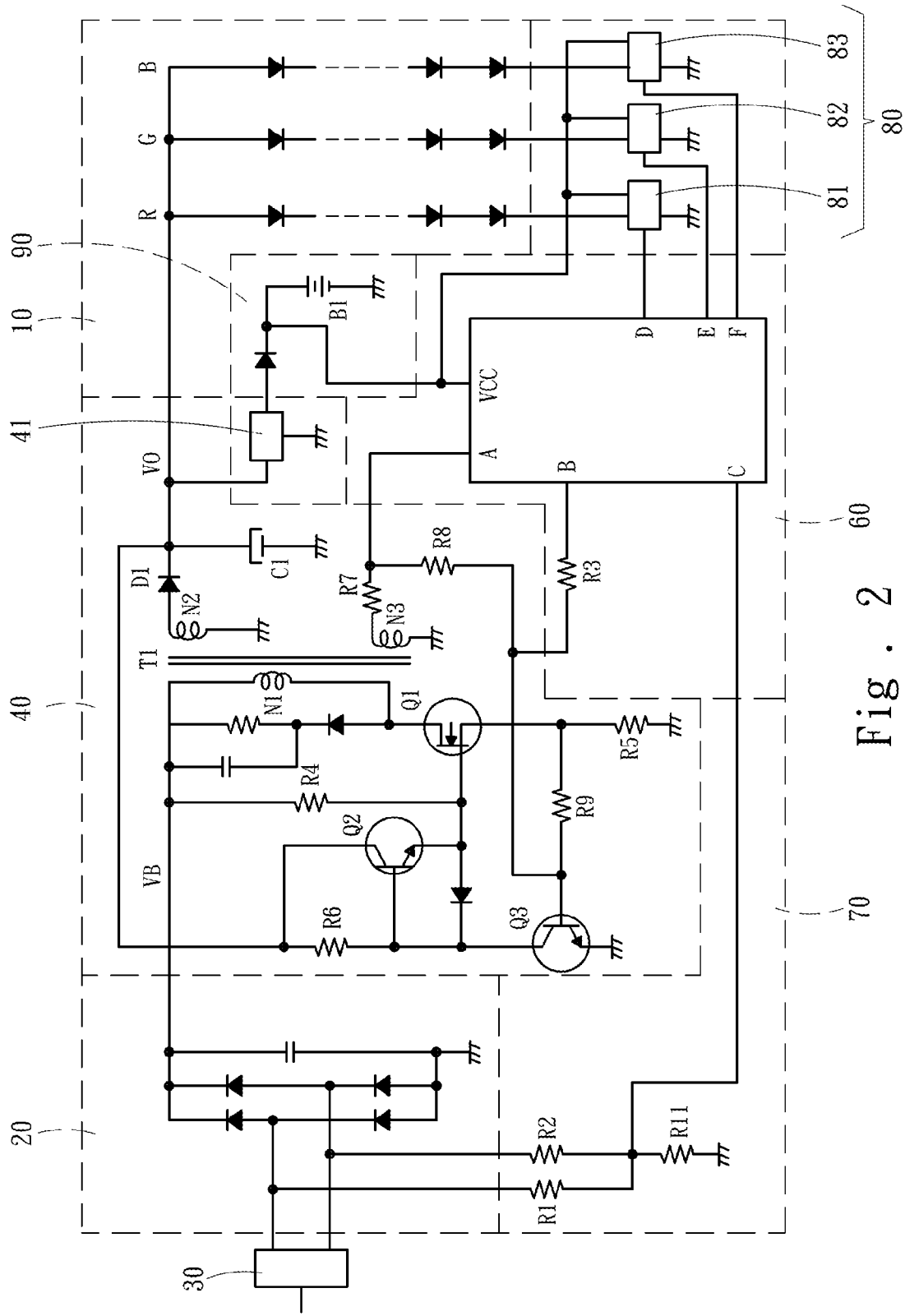
FIG. 2 is a circuit diagram of a device according to a second embodiment of the present invention.
Figure 3:
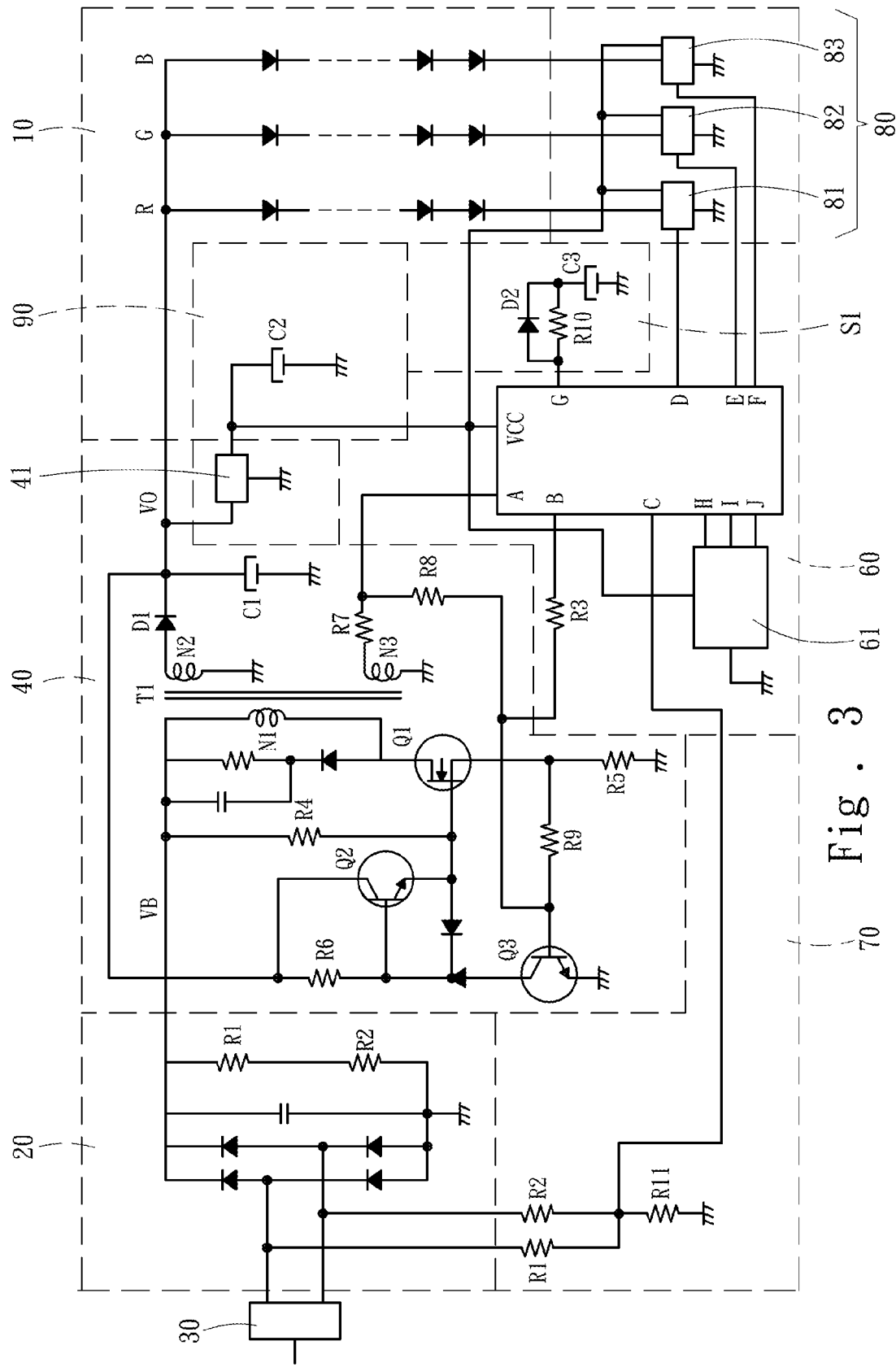
FIG. 3 is a circuit diagram of a device according to a third embodiment of the present invention.

Refer to FIG. 2 and FIG. 3. FIG. 2 shows a circuit diagram of a device according to a second embodiment of the present invention. FIG. 3 shows a circuit diagram according to a third embodiment of the present invention. It should be noted that, when the external power is interrupted, the operating voltage and the driving voltage are not generated. Hence, the conventional control method for the lighting device is performed in a condition where the external power is uninterrupted. However, in the present invention, the control method is performed by interrupting the external power and disposing the internal powering unit 90. In the first embodiment of the present invention, the internal powering unit 90 is a second capacitor C2 (as shown in FIG. 1). In the second embodiment of the present invention, the internal powering unit 90 is a powering battery B1 (as shown in FIG. 2). In the third embodiment of the present invention, different from foregoing embodiments, the control operations are performed by a read-only memory (ROM) and a resistor-capacitor (RC) unit S1 (as shown in FIG. 3). The ROM may be an electrically-erasable programmable read only memory (EEPROM). The ROM could be an electrically-erasable programmable read only memory (EEPROM). The EEPROM 61 could be integrate with the microprocessor in the microprocessor unit 60, or may be design with an EEPROM 61 integrated circuit. Details of the control operations are described below.

Figure 4:
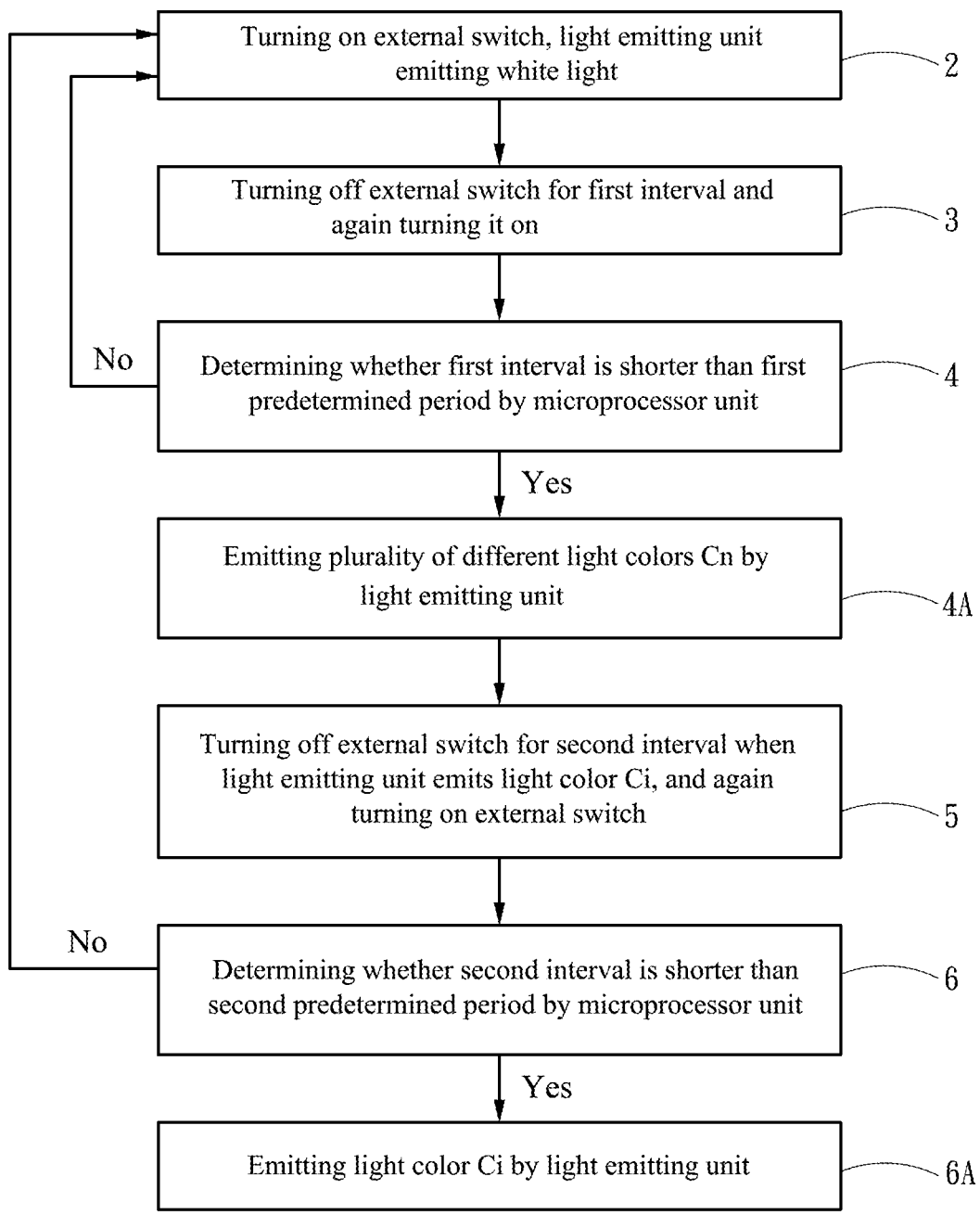
FIG. 4 is a flowchart of steps according to an embodiment of the present invention.

FIG. 4 shows a flowchart of steps according to an embodiment of the present invention. Referring to FIG. 4, a control method for a light color of a lighting device of the present invention includes following steps.

In step 1, the lighting device is provided. The lighting device includes the light emitting unit 10, the rectifier 20, the power converting circuit 40, the city power detecting unit 70 and the microprocessor unit 60. The light emitting unit 10 includes the LEDs. The rectifier 20 is electrically connected to the city power and determines by the external switch 30 whether to receive the external power from the city power to output the high voltage direct current. The power converting circuit 40 is electrically connected to the rectifier 20. In one embodiment, the power converting circuit 40 may be a self-excited power converting circuit. The city power detecting unit 70 is electrically connected between the external switch 30 and the rectifier 20. The microprocessor unit 60 is electrically connected between the power converting circuit 40 and the light emitting unit 10. More specifically, in the embodiment, the microprocessor unit 60 is electrically connected between the power converting circuit 40 and the constant current electronic switches 80.

In step 2, the external switch 30 is turned on to cause the power converting circuit 40 to receive the high voltage direct current and to perform the power conversion to output the operating voltage and the driving voltage. The microprocessor unit 60 receives the operating voltage, becomes activated and sends a color control signal. The light emitting unit 10 receives the color control signal via the constant current electronic switches 80 and then emits a white light.

In step 3, the external switch 30 is turned off for a first interval, and then is again turned on.

In step 4, the microprocessor unit 60 perform a first identification procedure that determines whether the first interval is shorter than a first predetermined period.

In step 4A, when the first interval is shorter than the first predetermined period, the microprocessor unit 60 sends a plurality of first color control signals to the light emitting unit 10 according to the timing sequence. The light emitting unit 10 receives the first color control signals via the constant current electronic switches 80, and then emits a plurality of different light colors $C_n$. There are n light colors $C_n$, and n is a parameter associated with the resolution. When the first interval is not shorter than the first predetermined period, the method returns to step 2.

In step 5, when the light emitting unit 10 again emits the light color $C_i$, the external switch 30 is turned off for a second interval and is then again turned on.

In step 6, the microprocessor unit 60 performs a second identification procedure that determines whether the second interval is shorter than the second predetermined period.

In step 6A, when the second interval is shorter than the second predetermined period, the microprocessor unit 60 sends the second color control signal to the light emitting unit 10. The light emitting unit 10 receives the second light control signal via the constant current electronic switches 80, and emits the color light corresponding to the light color $C_i$, where $C_i$ represents the light color emitted at the $i^{th}$ timing sequence. When the second interval is not shorter than the second predetermined period, the method returns to step 2.

In the first embodiment, as shown in FIG. 1, the lighting device further includes the internal powering unit 90 electrically connected to the microprocessor unit 60. In the embodiment, the internal powering unit 90 is the second capacitor C2, and step 3 further includes following steps. In step 3A-1, after the external switch 30 is turned off, power is released by the internal powering unit 90 to the microprocessor unit 60 to maintain operations. In step 3A-2, after the external switch 30 is again turned on, the operating voltage is provided to the microprocessor unit 60 to maintain operations. The first identification procedure is achieved by using the internal powering unit 90. Details of the first identification procedure are described below. First of all, electric energy is stored by the second capacitor C2. When the external power is interrupted, the driving voltage cannot be provided to the light emitting unit 10, and the operating voltage cannot be provided to the microprocessor unit 60. At this point, the second capacitor C2 releases the electric energy to the microprocessor unit 60 to maintain normal operations of the microprocessor unit 60. The duration from a beginning time point at which the second capacitor C2 releases the electric energy to the microprocessor unit 60, to an ending time point at which the second capacitor C2 completely depletes the electric energy and interrupts the operations of the microprocessor unit 60, is defined as the first predetermined period. Further, the duration from a beginning time point at which the external switch 30 is turned off, to an ending time point at which the external switch 30 is again turned on, is defined as the first interval.

Operation details are as below. The external switch 30 is turned on, and the external power outputs the high voltage direct current via the rectifier 20 to cause the light emitting unit 10 to emit the white light. Next, the external switch 30 is turned off. After the microprocessor unit 60 detects by the city power detecting unit 70 that the city power output is interrupted, the microprocessor unit 60 maintain normal operations through the electric energy released through the second capacitor C2 and pre-sets to a first operating mode. Meanwhile, a random access memory (RAM) built in the microprocessor in the microprocessor unit 60 records a first operating parameter of the first operating mode. The external switch 30 is again turned on after the first interval. The microprocessor unit 60 is changed to be powered by the external power. When the microprocessor unit 60 is in a normal operation state maintained by the electric energy the second capacitor C2 releases, and stays in the normal operation state maintained by the external power, the microprocessor unit 60 performs the first identification procedure that determines whether the first interval is shorter than the first predetermined period, sets and performs the first operating mode according to the first operating parameter stored in the RAM, and sends the plurality of first color control signals to the light emitting unit 10 according to a timing sequence to cause the light emitting unit 10 to emit the different light colors $C_n$. Conversely, when the external switch 30 is again turned on after the first interval, if operations of the microprocessor unit 60 are interrupted because the electric energy from the second capacitor C2 is depleted, the microprocessor unit 60 loses the setting of the first operating mode. Thus, when operations of the microprocessor unit 60 are restored by the external power, the microprocessor unit 60 performs an initial operating mode, i.e., emitting the white light.

In the second embodiment, as shown in FIG. 2, the lighting device further includes the internal powering unit 90. In this embodiment, the internal powering unit 90 is the powering battery B1. Different from the first embodiment, after the external power is interrupted, the electric power of the powering battery B1 is provided to the microprocessor unit 60 to maintain normal operations of the microprocessor unit 60, and the first identification procedure is set by the microprocessor unit 60. Similarly, according to the above approach, the first identification procedure and the second identification procedure are performed to determine whether the light emitting unit 10 is to emit the white light, the light color $C_n$ or the light color $C_i$. These repeated details are omitted herein.

In the third embodiment, as shown in FIG. 3, the lighting device further includes the internal powering unit 90, a third capacitor C3, the EEPROM 61 and the RC unit S1. The internal powering unit 90, the third capacitor C3, the EEPROM 61 and the RC unit S1 are all electrically connected to the microprocessor unit 60. In the embodiment, the internal powering unit 90 is the second capacitor C2, and the detecting capacitor is the third capacitor C3 and is located in the RC unit S1. In the embodiment, step 3 further includes following steps. In step 3B-1, after the external switch 30 is turned off, power is released from the internal powering unit 90 to the microprocessor unit 60 to maintain normal operations. In step 3B-2, after the external switch 30 is again turned on, power is supplied by the operating voltage to the microprocessor unit 60 to maintain normal operations. Different from the above-mentioned embodiments, the lighting device controls the light color through the EEPROM 61 and the RC unit S1, with associated details described below. When the RC unit S1 is powered by the external power, the microprocessor unit 60 charges the third capacitor C3 from a seventh end via a second diode D2. When the external power is interrupted, the seventh end G is at a low potential level, and the third capacitor C3 discharges to a tenth resistor R10 and an internal resistor of the seventh end G Meanwhile, a detecting capacitor voltage at two ends of the third capacitor C3 also drops. The time the voltage of the third capacitor C3 needs to drop to a predetermined potential level is the first predetermined period. Further, an RC time constant obtained from a product of a capacitance value of the third capacitor C3 and the internal resistor of the tenth resistor R10 is directly proportional to the first predetermined period. The EEPROM 61 with stored data therein is not affected by the interruption of the external power. Thus, when the external power is restored to provide power, the microprocessor unit 60 may retrieve data from the EEPROM 61 via an eighth end H, a ninth end I and a tenth end J, and may further detect a remaining voltage of the third capacitor C3. When the remaining voltage is greater than a predetermined value, it is determined that the first interval is shorter than the first predetermined period. Hence, the plurality of first color control signals are sent according to a timing sequence to the light emitting unit 10 to cause the light emitting unit 10 to emit the different light colors C. Conversely, when the remaining voltage is lower than the predetermined value, it is determined that the first interval is longer than the first predetermined period, and the initial operating mode is performed to emit the white light. In the embodiment, the approach for determining the second predetermined period is same as that for the first predetermined period. Further, when the remaining voltage is greater than the predetermined value, the microprocessor unit 60 sends the second color control signal to the light emitting unit 10 to cause the light emitting unit 10 to emit the color light corresponding to the light color $C_i$. Otherwise, the initial operating mode is performed to emit the white light. Such repeated details are omitted herein.

In conclusion, by determining whether the first interval and the second interval are respectively shorter than the first predetermined period and the second predetermined period, different light emitting modes of the lighting device and the light color emitted by the lighting device are controlled. Thus, a user may determine the lengths of the first interval and the second interval through the external switch to accordingly control the light emitting mode and the light color desired, thereby achieving simplified operations and reduced costs without involving an additional control device.

What is claimed is:

1. A control method for a light color of a lighting device, comprising steps of:
   step 1: providing a lighting device, the lighting device comprising a light emitting unit comprising a plurality of light emitting diodes (LEDs), a rectifier electrically connected to a city power and controlled by an external switch whether to obtain an external power from the city power to output a high voltage direct current, a power converting circuit electrically connected to the rectifier, a city power detecting unit electrically connected between the external power and the rectifier, and a microprocessor unit electrically connected between the power converting circuit and the light emitting unit;
   step 2: turning on the external switch, to cause the power converting circuit to receive the high voltage direct current and to perform a power conversion to output an operating voltage and a driving voltage, the microprocessor unit receiving the operating voltage and becoming turned on to send a color control signal, and the light emitting unit receiving the color control signal and then emitting a white light;
   step 3: turning off the external switch for a first interval and again turning on the external switch;
   step 4: performing a first identification procedure by the microprocessor unit that determines that the first interval is shorter than a first predetermined period and then sending a plurality of first color control signals to the light emitting unit according to a timing sequence, and the light emitting unit receiving the first color control signals and then emitting a plurality of different light colors Cn, wherein there are n light colors Cn and n is a parameter associated with a resolution;
   step 5: turning off the external switch for a second interval when the light emitting unit sends the light color Ci, and again turning on the external switch; and
   step 6: performing a second identification procedure by the microprocessor unit that determines that the second interval is shorter than a second predetermined period, and then sending a second color control signal to the light emitting unit, and the light emitting unit receiving the second color control signal and then emitting a color light corresponding to the light color Ci, where Ci is a light color emitted at an ith timing sequence.

2. The control method for a light color of a lighting device of claim 1, wherein the lighting device further comprises an internal powering unit electrically connected to the microprocessor unit, and step 3 further comprises steps of:
   step 3A-1: providing power of the internal powering unit to the microprocessor unit to maintain operations after the external switch is turned off; and
   step 3A-2: providing power by the operating voltage to the microprocessor unit to maintain operations after the external switch is again turned on; wherein, when the external switch is again turned on, if the microprocessor unit is still powered by the internal powering unit and operations of the microprocessor unit are not interrupted, it is determined that the first interval is shorter than the first predetermined period.

3. The control method for a light color of a lighting device of claim 1, wherein the lighting device further comprises an internal powering unit and a detecting capacitor electrically connected to microprocessor unit, and step 3 further comprises steps of:
   step 3B-1: providing power of the internal powering unit to the microprocessor unit to maintain operations after the external switch is turned off; and
   step 3B-2, providing power by the operating voltage to the microprocessor unit to maintain operations after the external switch is again turned on; wherein, when the external switch is again turned on, if a remaining voltage of the detecting capacitor is greater than a predetermined value, it is determined that the first interval is shorter than the first predetermined period.

4. A lighting device, comprising:
   a light emitting unit, comprising a plurality of light emitting diodes (LEDs);
   a rectifier, electrically connected to a city power and controlled by an external switch whether to obtain an external power from the city power to output a high voltage direct current;
   a power converting circuit, electrically connected to the rectifier, receiving the high voltage direct current to automatically become activated and to perform a power conversion to output an operating voltage and a driving voltage; and
   a microprocessor unit, electrically connected between the power converting circuit and the light emitting unit, receiving the operating voltage and then becoming activated, the microprocessor unit determining that the external switch is turned off for shorter than a first predetermined period and again turned on, and then sending a plurality of first color control signals to the light emitting unit according to a timing sequence to cause the light emitting unit to emit a plurality of different light colors Cn, wherein there are n light colors Cn, and n is a parameter associated with a resolution;
   wherein, when the light emitting unit emits the light color Ci, the microprocessor unit determines that the external switch is turned off for shorter than a second predetermined period and then again turned on, and then sends a second color control signal to the light emitting unit, and the light emitting unit receives the second color control signal and then emits a color light corresponding to the light color Ci.

5. The lighting device of claim 4, wherein the rectifier comprises a plurality of diodes and a capacitor connected in parallel to the diodes.

6. The lighting device of claim 4, further comprising: a city power detecting unit, electrically connected between the external power and the rectifier, comprising an output node electrically connected to the microprocessor unit.

7. The lighting device of claim 4, further comprising: a plurality of constant current electronic switches, electrically connected between the LEDs and the microprocessor unit.

8. The lighting device of claim 4, further comprising: an internal powering unit, electrically connected to the microprocessor unit, being a battery or a capacitor.

9. The lighting device of claim 4, further comprising: an electrically-erasable programmable read-only memory (EEPROM) and a detecting capacitor electrically connected to the microprocessor unit.

* * * * *